Dec. 15, 1964    A. L. MUZINICH    3,161,004
PRODUCE PACKING TABLE UNIT
Filed Aug. 21, 1962    2 Sheets-Sheet 1

INVENTOR.
ANTHONY L. MUZINICH
BY
ATTORNEY

Dec. 15, 1964   A. L. MUZINICH   3,161,004
PRODUCE PACKING TABLE UNIT
Filed Aug. 21, 1962   2 Sheets-Sheet 2
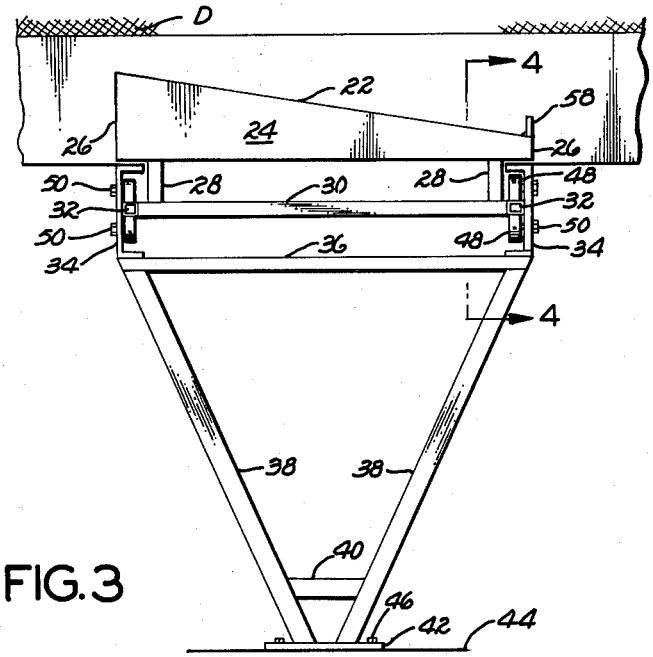
FIG. 3
FIG. 4
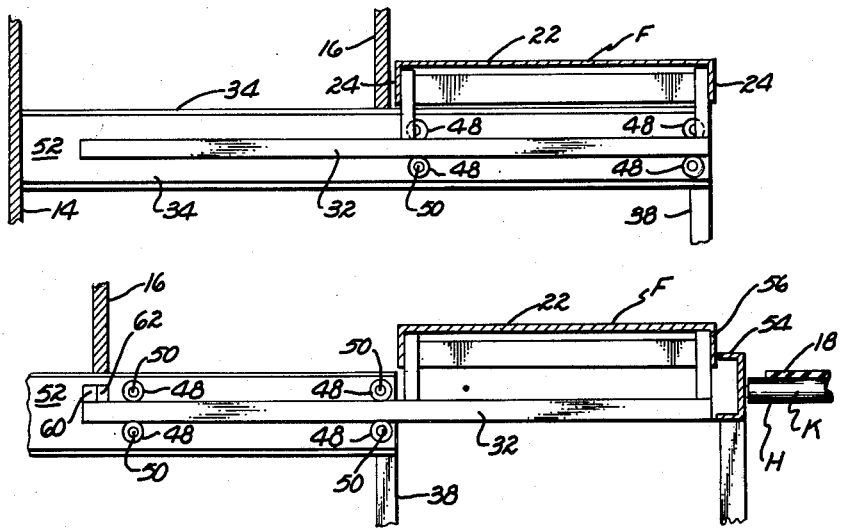
FIG. 5
INVENTOR.
ANTHONY L. MUZINICH
BY
ATTORNEY United States Patent Office 3,161,004
Patented Dec. 15, 1964

3,161,004
PRODUCE PACKING TABLE UNIT
Anthony L. Muzinich, 207 Panorama Drive,
Wheeler Ridge, Calif.
Filed Aug. 21, 1962, Ser. No. 218,408
1 Claim. (Cl. 53—391)

The present invention relates generally to the packing industry, and more particularly to an apparatus which permits of more efficient and economical crating or packing of farm produce.

During the past few years the packing of farm produce for the market has become increasingly mechanized, not only to speed up this operation, but to lower the cost thereof as well. A common expedient employed in mechanized packing of farm produce has been to use elongate conveyors to transfer the produce onto the sorting tables as well as similar conveyors to transport the packed crates to a warehouse or other desired location.

The handling of such farm produce as field corn is normally carried out in two stages. The produce from the field or warehouse is first discharged at random onto a conveyor belt that passes sorter stations at which corn of a certain quality is selected from the moving mass, and placed in a second stationary position. A number of women packers are so located that they can reach the sorted produce from this second position and pack the ears of corn in crates or other box-like containers. Heretofore, because each packed crate or container is too heavy for the women packers to lift, a number of workmen had to be available to transfer the packed crates onto a second moving conveyor belt for transportation to a warehouse or other location.

A major object of the present invention is to further mechanize the packing of farm products such as field corn by providing a novel table means of supporting an empty crate or container in a first position wherein a woman packer packs it with selected ears of corn and thereafter the table unit is utilized to move the packed crate into a second position from which the packer can slip or deposit it onto a moving conveyor belt without the necessity of lifting it.

Another object of the invention is to supply a more efficient device for the economical handling of crates or other box-like containers, both during and after packing thereof, which not only speeds up packing operations, but reduces the cost thereof.

A further object of the invention is to provide a unit which is so associated with conveyor belt systems utilized in the packing of farm product that the necessity of using workmen to lift the packed crates onto a second conveyor belt is eliminated, thus permitting such personnel to be utilized for other purposes in the packing plant.

A still further object of the invention is to supply means to permit women packers to be more efficient in that no time is lost after packing of a crate and the transfer thereof onto a conveyor belt whereby the packers, if on a piecework basis, are able to materially increase their earnings.

These and other objects and advantages of the invention will become apparent from the following description of a preferred form thereof, and from the accompanying drawings illustrating the same in which:

FIGURE 1 is a perspective view of a farm produce packing plant, showing the manner in which the produce is sorted, packed into crates or containers, and discharged onto a conveyor system;

FIGURE 2 is a transverse, cross-sectional view showing a first conveyor on which farm produce is transported for sorting, a downwardly inclined area on which the sorted produce is placed, a crate in which the sorted produce is packed, and the transfer of the packed crate onto a second conveyor belt, with a third conveyor belt being shown on the right-hand side which carries empty crates to the packers;

FIGURE 3 is an end elevational view of the invention;

FIGURE 4 is a transverse cross-sectional view of the device taken on line 4—4 of FIGURE 3; and FIGURE 5 is a continuation of the vertical cross-sectional view shown in FIGURE 4.

Figure 1:
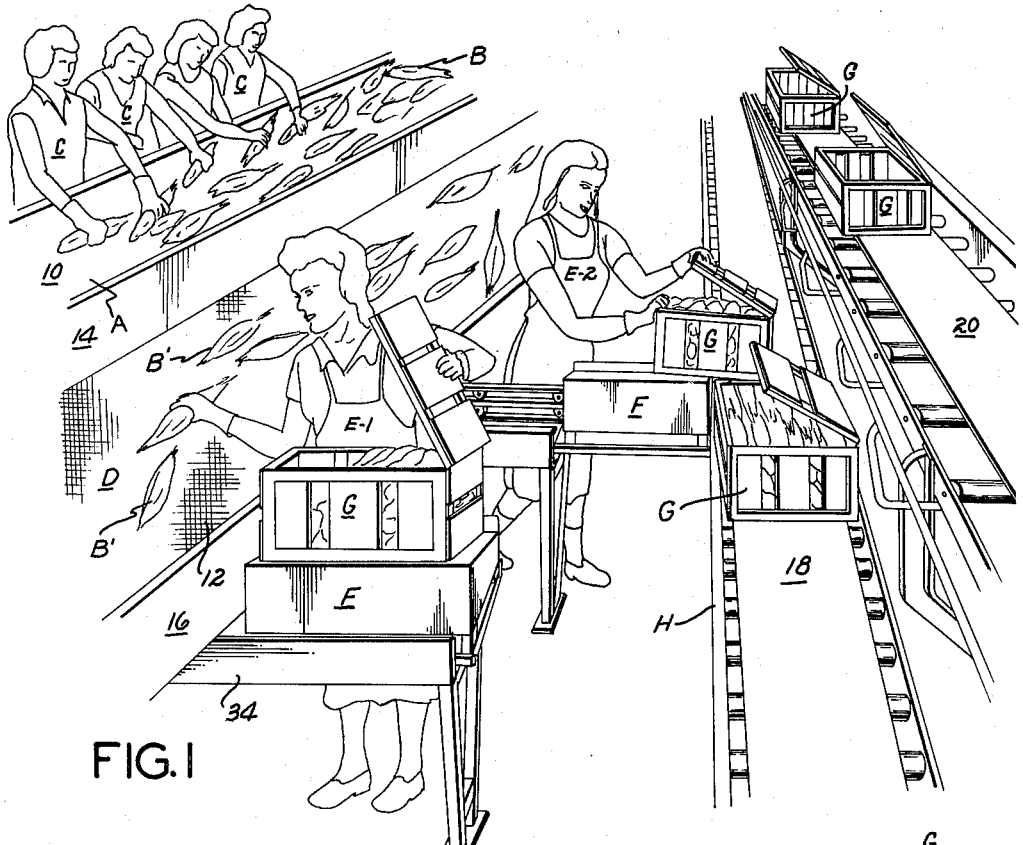

With continuing reference to the drawings for the general arrangement of the invention, it will be seen that a first elongate conveyor belt A is provided that has a horizontal upper reach 10. Farm produce B is dumped at random on one end of conveyor belt A and passed therealong by a number of longitudinally spaced sorters C, as shown in FIGURE 1. The sorters C select farm produce B' of a certain quality from produce B as it moves past them and manually deposit the sorted produce B' on a downwardly inclined supporting area D. Area D is defined by a heavy screen-like sheet 12, the upper longitudinal edge of which is affixed to a stationary side member 14 forming a part of the first conveyor, with the lower edge of the sheet being attached to the inner upper portion of a longitudinally extending upright 16.

A number of women packers E-1 and E-2, only two of which are shown in the drawings, are longitudinally spaced adjacent the area D on which the sorted farm produce B' is supported. Each packer is provided with a movable table F on which a crate or container G is supported. In FIGURE 1 a woman packer E-1 is shown packing a crate G, which together with one of the tables F to support the same, are in a first position. A second woman packer E-2, also shown in FIGURE 1, is in the position she occupies after one of the crates G is filled and with the supporting table F therefor having been moved to a second position where the packed crate is ready to be pushed onto a second conveyor H that has an upper horizontal reach 18 which moves in the same direction as reach 10. A packed and closed crate G is also shown in FIGURE 1 after is has been moved from one of the tables F onto the conveyor H for transportation to a warehouse or other desired destination.

A third conveyor J having an upper horizontal reach 20 is illustrated in FIGURE 1 that serves to move empty crates G into positions where they can be grasped by the women packers and placed onto their individual tables F to be packed as previously described.

The reaches 10, 18 and 20 of the conveyors are supported on a number of transverse, longitudinally spaced rollers K in the conventional manner. Reach 20 of the third conveyor J moves in the same direction as reaches 10 and 18, and is positioned above reach 18 at such an elevation that the empty crates F carried thereby may be easily grasped in passing by the packers as required.

In detail, each table F as shown in FIGURES 3 to 5 inclusive, includes a flat upper plate 22 that tapers downwardly and to the right (FIGURE 3). Plate 22 has two end walls 24 and two side walls 26 extending downwardly from the edges thereof. Two transversely spaced, longitudinally aligned legs 28 depend from each end wall 24. Each pair of legs 28 is in turn connected by a transverse bar 30, the ends of which serve to support two parallel longitudinally extending rails, as best illustrated in FIGURE 3.

Figure 2:
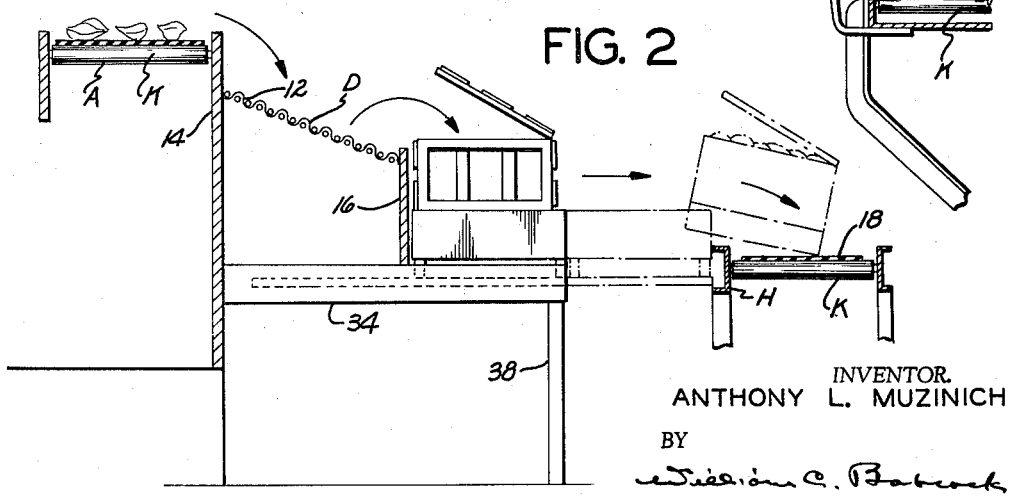

Two parallel transversely spaced, longitudinally aligned channels 34 or other rigid members are provided, with the lower flange of each channel being welded or otherwise affixed to a rigid rectangular frame 36. On a first end thereof (FIGURE 3), frame 36 has two rigid supporting members 38 extending downwardly therefrom that taper inwardly towards one another, and are preferably connected on the lower portions thereof by a short connecting member 40. The lower ends of members 38 are welded or otherwise affixed to a base 42 that is secured to a floor surface 44 by bolts 46 or other conventional fastening means. Second ends of the channels 34, as may best be seen in FIGURE 4, are welded or otherwise affixed to the side member 14 in the first conveyor A, as shown in FIGURE 2.

The rails 32 are disposed between pairs of rollers 48 that are situated on the interior surfaces of channels 34, as best seen in FIGURES 3–5 inclusive. The rollers 48 are rotatably supported on pins or bolts 50 that project inwardly from the webs 52 of the channels 34. The rails 32, rollers 48 and channels 34 cooperatively permit each of the tables F to occupy a first position as shown in FIGURE 4 where the empty crates G can be packed with farm produce B', and together with the table F then moved to a second position (FIGURE 5) where the filled crate can be shoved by the packer onto the upper reach 18 of the second conveyor H.

Conveyor H includes a longitudinally extending channel 54 that is at such elevation as to be contacted by a first end 56 of each table F as the table is moved to the second position, as shown in FIGURE 5. The channel 54 serves not only as a support for the upper reach 18 of conveyor H, but also as a stop to limit the movement of each table F after it has been moved to a position where a filled crate G can be manually slid therefrom by a packer onto the upper reach 18 of second conveyor H. To guide the crate G as it is slid from the plate 22, a rib 58 extends along the lower longitudinal edge of the plate as viewed in FIGURE 3. The plate 22 tapers downwardly towards the rib 58 so that any tendency of the crate, whether empty or filled, to slide, will be towards the rib 58 whereby inadvertent displacement of a crate G from the plate will be prevented.

The use and operation of the invention is relatively simple. The farm produce B passes before the sorters C (FIGURE 1) and sorted. Thereafter the produce B' is deposited by the sorters on the downwardly inclined supporting surface D. The packers E–1 and E–2, and others (not shown) select the sorted farm produce B' and place it in empty crates G that are supported on movable tables F when they are in a first position as shown with the packer E–1 in FIGURE 1. After the crate G has been packed with farm produce, the crate and table F are then manually moved by a packer (E–2 in FIGURE 1), to a second position where the packer slides the crate onto the upper reach 18 of second conveyor H, without the necessity of manually lifting the crate.

In FIGURE 2 it will be seen that the plate 22 is positioned above the upper reach 18 of second conveyor H when the table F is in a second position, and as the crate G is slid from the table F it falls onto the upper reach 18 of the conveyor by force of gravity. After one of the filled crates G has been slid from a table F when in the second position, the packer grasps one of the empty crates G that is being transported on the third conveyor J to place it onto the plate 22 of the table in a position ready to be filled and then returns the table with the empty crate thereon to the first position where it is filled and the above described cycle is repeated.

Should it be so desired, the table F may be stopped when it reaches the second position shown in FIGURE 5 by stops 60 that are mounted on rails 32 which contact lugs 62 that are rigidly affixed to the interior surfaces of channels 34.

In using the invention, the filled crate G can be manually slid from the table F, or if the table F is moved rapidly to the second position, and then suddenly stopped, the momentum imparted to the crate will cause it to slide from the table onto the second conveyor H.

Although the invention has been illustrated with field corn as an example, it will be apparent that it may also be used with any farm produce that is adapted for sorting and packing according to the method above described.

It will be obvious to those skilled in the art that various changes may be made in my invention without departing from the spirit and scope thereof, and therefore the invention is not limited by that which is shown in the drawings and described in the specification, but only as indicated in the appended claim.

I claim:

In a system for packing crates with sorted farm produce:

(a) a first horizontally disposed driven conveyor for carrying said farm produce dumped at random thereon;

(b) a perforated sheet that extends angularly downwardly from one longitudinal side of said first conveyor, which sheet is sufficiently strong to support produce which has been removably sorted from said produce on said first conveyor;

(c) an upright extending longitudinally along the lower end of said sheet to prevent said sorted produce from rolling therefrom;

(d) a plurality of tables in longitudinal spaced relationship along said upright, each of which tables is adapted to support an empty crate to be packed with said sorted produce;

(e) a second horizontal driven conveyor on which crates packed with said sorted produce can be deposited, said second conveyor being at a lower elevation than the upper surfaces of said tables;

(f) a third horizontal driven conveyor disposed above said second conveyor that is parallel and adjacent thereto, which third conveyor serves to transport empty crates;

(g) means for movably supporting each of said tables to permit each of said tables to be disposed in a first position adjacent said upright where an empty crate thereon can be packed with said sorted produce and thereafter said table and packed crate manually moved to a second position adjacent said conveyor; and (h) means for abruptly stopping each of said tables when it reaches said second position to cause said packed crate to slide therefrom onto said second conveyor, and said table when in said second position and after said packed crate has slid therefrom capable of receiving one of said empty crates from said third conveyor to be thereafter returned to said first position where said empty crate is packed with said sorted produce.

References Cited by the Examiner

UNITED STATES PATENTS

| Re. 16,392 | 7/26 | Wilhelm | 53—390 |
| 1,095,073 | 4/14 | Bish | 211—162 X |
| 1,270,501 | 6/18 | Dohm | 198—19 X |

SAMUEL F. COLEMAN, *Acting Primary Examiner.*

E. A. SROKA, *Examiner.*